United States Patent [19]
Booth

[11] Patent Number: 5,619,255
[45] Date of Patent: Apr. 8, 1997

[54] WIDE-SCREEN VIDEO SYSTEM

[75] Inventor: Daniel A. Booth, Ithaca, N.Y.

[73] Assignee: Cornell Research Foundation, Inc., Ithaca, N.Y.

[21] Appl. No.: 293,204

[22] Filed: Aug. 19, 1994

[51] Int. Cl.$^6$ .................................................... H04N 7/00
[52] U.S. Cl. ................................ 348/36; 348/38; 348/779
[58] Field of Search .................................. 348/36, 38, 39, 348/383, 744, 745, 776, 778, 779, 781, 782, 121

[56] References Cited

U.S. PATENT DOCUMENTS

| | | |
|---|---|---|
| 2,896,503 | 7/1959 | Smith . |
| 2,918,843 | 12/1959 | Smith . |
| 3,291,905 | 12/1966 | Smith .................................. 348/38 |
| 4,345,817 | 8/1982 | Gwynn . |
| 4,355,328 | 10/1982 | Kulik .................................. 348/38 |
| 4,757,378 | 7/1988 | Hackett et al. . |
| 4,772,942 | 9/1988 | Tuck . |
| 4,868,682 | 9/1989 | Shimizu et al. . |
| 4,974,073 | 11/1990 | Inova . |
| 5,136,390 | 8/1992 | Inova et al. . |
| 5,181,122 | 1/1993 | Ooishi .................................. 348/779 |

OTHER PUBLICATIONS

SMPTE Journal Aug. 9, 1980 excerpt pp. 579–581.

*Primary Examiner*—Amelia Au
*Attorney, Agent, or Firm*—Jones, Tullar & Cooper, P.C.

[57] ABSTRACT

An apparatus and method for displaying wide-screen images by assembling a composite image from three or more video segments, wherein a panoramic or cinematic wide-screen image is captured using three or more standard video cameras that are lined up, side-by-side, and are positioned on their sides such that the scan lines for each video camera run vertically. The cameras are arrayed radially and each captures a segment of the image. First, second and third video signals representing the image segments are input to corresponding first, second and third television monitors. The monitors are also positioned on their sides such that their scan lines also run vertically. The monitors are arranged around a half-silvered mirror which is inclined at forty-five degrees with respect to the floor. The first and third monitors are placed above the half-silvered mirror and spaced apart, and the second monitor is positioned behind the half-silvered mirror, opposite a viewing position and between the first and third monitors. The respective image segments are reflected from or transmitted through the mirror from the three monitors such that, from the viewing position, the mirror appears to be a continuous screen with the image segments from the first, second and third monitors juxtaposed in one continuous wide-screen presentation.

12 Claims, 3 Drawing Sheets

WIDE-SCREEN VIDEO SYSTEM

BACKGROUND OF THE INVENTION

The present invention pertains, in general, to a method and system for capturing and then displaying wide-screen images using components which are readily available. Standard video cameras, camcorders, video cassette recorders and standard television sets may be used in implementing the present invention.

Wide-screen images are those images which have a panoramic aspect or those which are customarily used in cinema. Such images normally have much greater width than height. As such, wide-screen images are not amenable to display on standard television sets. The aspect ratio (or ratio width to height) for a television set which conforms to FCC standards is four to three (4:3). This familiar shape is not as wide as a cinema screen, for a given screen height.

Video cameras which conform to the FCC standards for television also have the 4:3 aspect ratio. Thus, standard video cameras are no more suitable for capturing wide-screen images than standard television sets are for displaying them.

Turning now to a discussion of the history of cinema formats, it is noted that since the 1950's, when motion picture producers first sought to lure the public away from their televisions, a number of wide-screen cinema systems have been popular. The first of these, and the one most similar in result to the video system described herein, was Cinerama (tm), which combined three higher-than-wide film images into a continuous panorama projected onto a deeply curved screen covering an angle (both taken and projected) of nearly 150 lateral degrees, at an aggregate aspect ratio of 2.66:1.

Although popular at the time, Cinerama was too expensive and impractical for most film production. It's success, however, did lead to the development of other standards, such as anamorphic 35 mm cinematography, in which cylindrical lenses compressed the horizontal field of the image taken during cinematography. Cylindrical lenses also were used to spread the image in projection. As standardized, these anamorphic 35 mm cinematography systems yielded a projected aspect ratio of 2.4:1.

Other responses to Cinerama included the so-called "wide-format 70 mm" systems such as Todd-AO (tm), Super Panavision (tm), Super Technirama (tm), and Ultra-Panavision (tm). With the exception of the latter (now obsolete), these formats yielded an aspect ratio of 2.21:1 and provided six discrete channels of audio.

The other wide screen format, currently the most common, is simple frame masking, in which the 35 mm 4:3 image is matted either in photography or projection to a ratio of approximately 1.85:1.

Thus, a number of wide-screen formats have found favor in the cinema, and all of them are too wide to display on a standard television. Put another way, television equipment which conforms to FCC standards cannot be used for recording or displaying these wide-screen images. If it is desired to capture an image having an aspect ratio of greater than 4.3, video cameras and television sets which conform to FCC standards cannot be used.

In the prior art, attempts to accommodate this lack of (aspect ratio) compatibility have generally proven unsatisfactory. At least one television manufacturer, ProScan (tm), produced televisions with tubes having aspect ratios of greater than 2:1. These televisions have tended to be very expensive to produce, since special electronic processing was needed to accommodate television broadcasts which conform to FCC standards as well as accommodating special broadcasts which have been "letter-boxed".

Letter-boxing is an attempt at adapting cinema images to the 4:3 television displays by wasting space. For letter-box processing, the cinema image is recorded with black bands above and below the cinema image to render a result which uses all of the television screen's width but does not use all of the height, thus adapting a 2.66:1 image to a 4:3 display. The result is a tiny movie screen with poor resolution of the cinema image's details.

Another approach to compensating for the incompatibility between standard television and cinema image sizes is the uncorrected distortion of an anamorphic cinematic image, which maintains the vertical aspect of the captured image while compressing the width or horizontal aspect of the image. This gives a badly distorted "fun house mirror" character to the cinematic image.

All of these efforts have proved unsatisfactory, either because the reproduced image size is too small or because the reproduced image size is badly distorted. This gives rise to a need for some way to record or transcribe wide-screen images using standard television componentry. Television video cameras, camcorders and television sets are most desirable since the standard television components are produced in great numbers and are therefore available at economical prices.

SUMMARY OF THE INVENTION

The present invention is directed to an apparatus and method for capturing and then displaying wide-screen images by capturing a number of video image segments and then assembling those video image segments into a composite wide-screen image.

The objective image to be captured is deemed a wide-screen image. This image is captured as three or more image segments. The image segments are then displayed together to form a wide-screen composite image where the result is a composite of the segments.

The objective image, or wide-screen image, can be a projected cinematic image which is to be recorded or merely transmitted over video equipment. The wide-screen image may also be a natural scene of panoramic aspect, such as a mountain scene.

It is an object of the present invention to display an apparently continuous composite image which is captured and then displayed from contiguous image segments that are processed using standard video equipment. It is another object of this invention to transcribe wide-screen images in three or more segments where each segment is captured, processed, and then displayed using standard television equipment. It is also an object of this invention to assemble a composite image from contiguous image segments where the image segments are easily aligned, such that the composite image has very little distortion and therefore appears to be one continuous wide-screen image.

The wide-screen image is captured using at least three standard video cameras. The cameras are lined up on a horizontal reference plane, side-by-side, and are positioned so that the scan lines for each camera's video signal run vertically (or perpendicularly to the reference plane), from top to bottom. The cameras are arrayed radially to capture corresponding side-by-side segments of the wide-screen image. The cameras thus produce at least first, second, and third video segments signals corresponding to the three side-by-side image segments. Additional cameras can be used, if desired, but in the preferred form of the invention, three cameras provide satisfactory results.

The first, second, and third video signals are supplied to corresponding first, second, and third television sets or video monitors. The monitors are also placed so that the displayed scan lines run vertically (or perpendicularly to a horizontal reference plane).

The monitors are laterally spaced and arranged above (or below) and behind a half-silvered mirror which is inclined at 45° with respect to a horizontal plane having a top (or bottom) surface directed toward a viewing position. The first and third monitors are positioned above (or below) the half-silvered mirror, facing downwardly (or upwardly) toward the top (or bottom) surface of the mirror while the second monitor is positioned behind the half-silvered mirror facing the viewing position, and is between the first and third monitors. The image segments from the downward (or upward) facing first and third monitors are reflected toward the viewing position and the image segment from the centrally positioned second monitor is transmitted through the half-silvered mirror toward the viewing position. The first, second, and third image segments are in a side-by-side alignment so that, from the viewing position, the half-silvered mirror appears to be a continuous screen with the displayed image segments from the first, second, and third monitors arrayed in one continuous wide-screen presentation.

BRIEF DESCRIPTION OF THE DRAWINGS

The foregoing and additional objects, features, and advantages of the invention will become apparent to those of skill in the art from the following detailed description of the preferred embodiment, taken with the accompanying drawings, in which.

DETAILED DESCRIPTION

Figure 1:
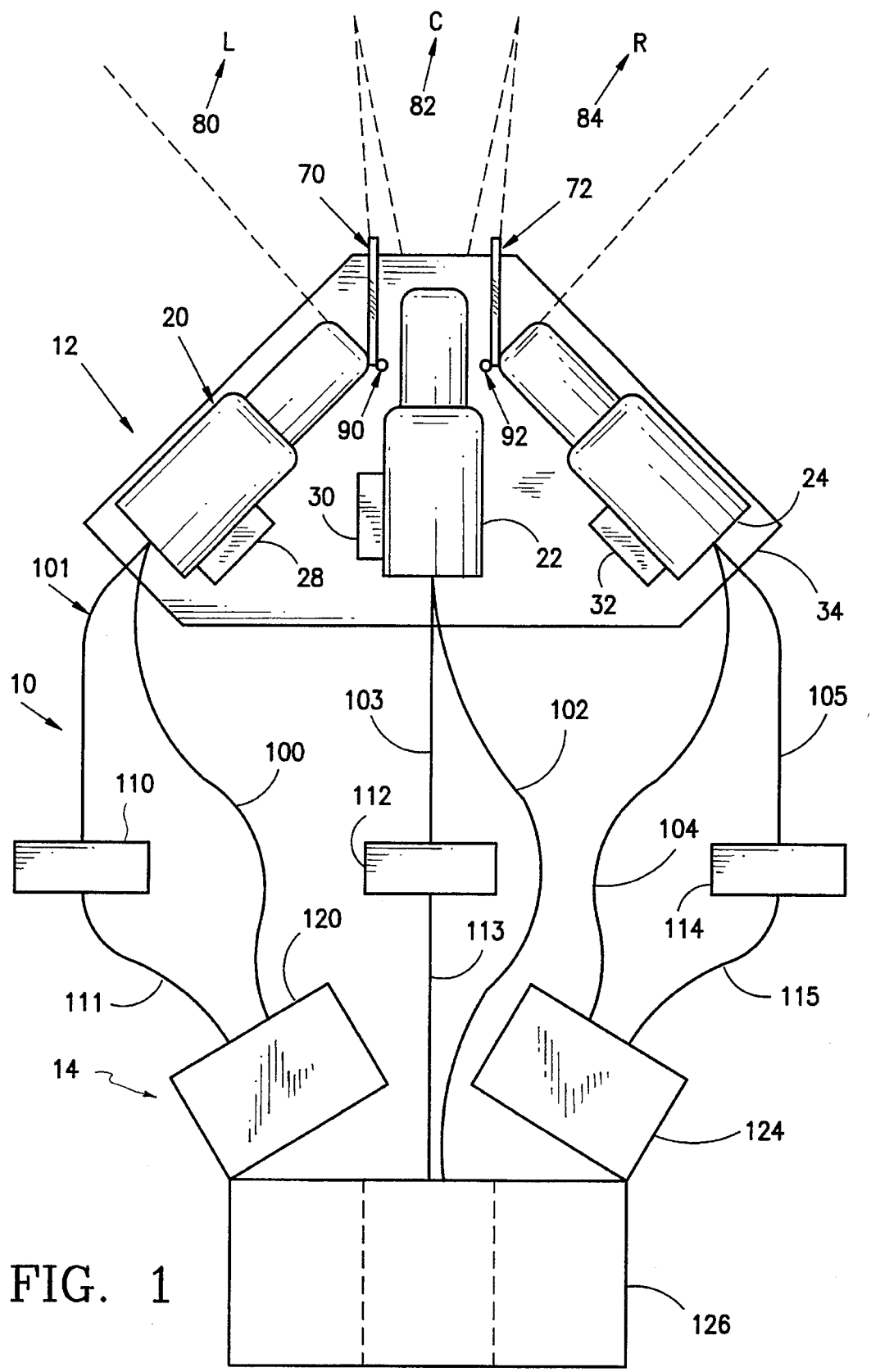
FIG. 1 illustrates, in a diagrammatic form, a preferred embodiment of a wide-screen video system incorporating the features of the present invention, including a camera portion and a display portion.

Turning now to a more detailed description of the invention, there is illustrated in FIG. 1 a preferred embodiment of a wide-screen video system 10 including a camera portion 12 and a display portion 14. Wide-screen images are captured in the camera portion 12 using cameras 20, 22, and 24.

Cameras 20, 22, and 24 generate image segment signals. Each camera is mounted to a base; camera 20 is mounted to base 28, camera 22 is mounted to base 30, camera 24 is mounted to base 32. Mounting bases 28, 30, and 32 are preferably the standard camera mounting bases which are customarily found on tripods for mounting cameras, using a threaded stud, or the like. Such mounting bases customarily are fixed to the bottom of a camera. Here, mounting bases 28, 30, and 32 are attached to the bottom of cameras 20, 22, and 24.

The three bases, 28, 30, and 32, are in turn affixed upon a common horizontal platform 34.

Figure 2:
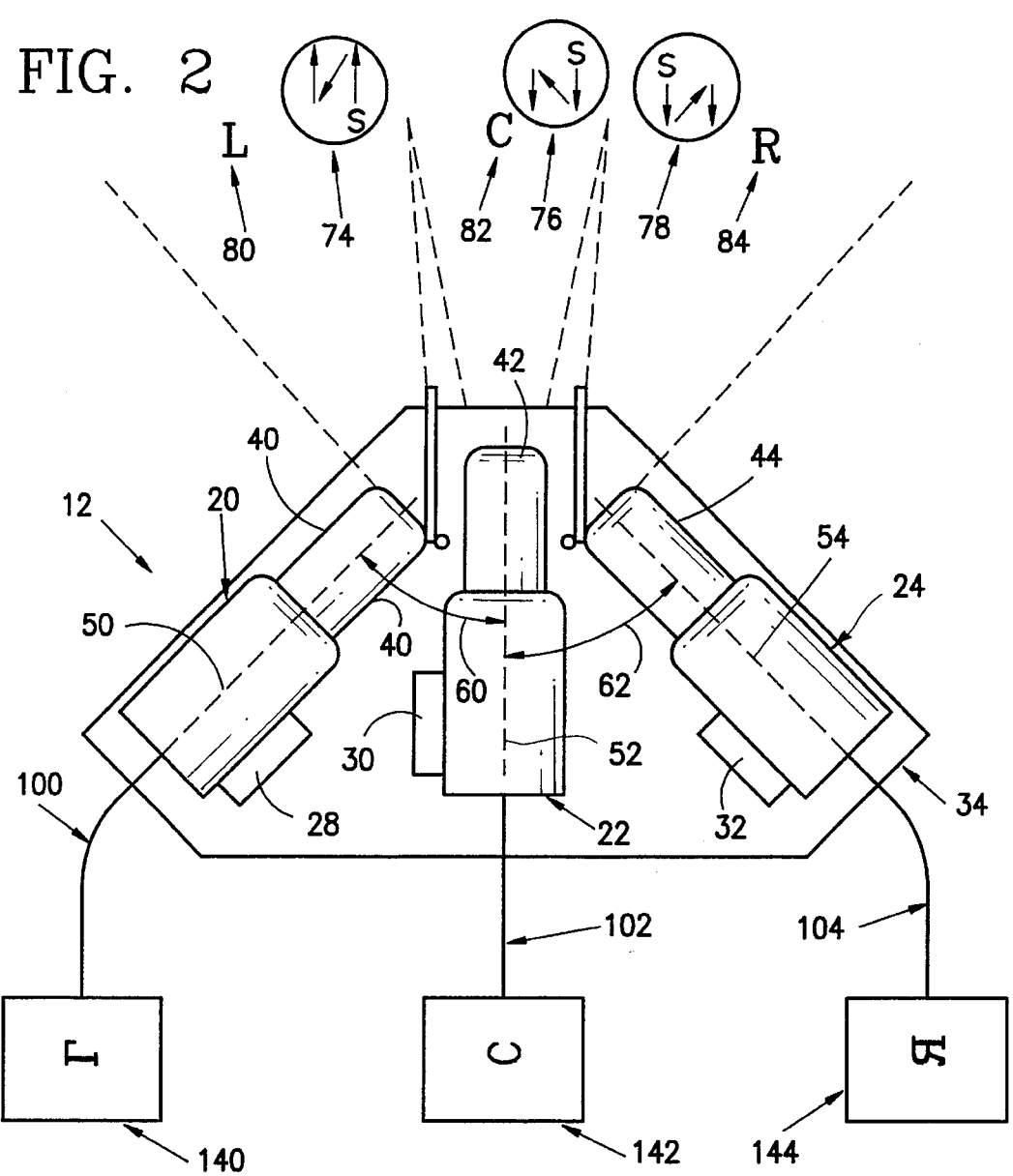
FIG. 2 illustrates, in a diagrammatic form, a preferred embodiment of the camera portion of the present invention along with the expected images that will be produced from the preferred configuration.

Each camera has a central axis which is defined as a center line that runs through an attached lens. As shown in FIG. 2, camera 20 has lens 40, camera 22 has lens 42, and camera 24 has lens 44. The center axis of camera 20, which serves as the center line of lens 40, is shown as line 50 in FIG. 2. Analogously, the center axis of camera 22 is shown as 52, and the center axis of camera 24 is shown as 54. The center axes 50, 52, and 54 of the three cameras 20, 22, and 24 are used to define the orientation of cameras 20, 22, and 24 on platform 34. The three cameras are radially arrayed with an angular displacement between the camera axes 50, 52, and 54. The angular displacement should ideally be in a range between 32 and 37 degrees. The angular displacement between the axes of camera 20 and camera 22 is shown in FIG. 2 as angle 60. The angular displacement between center axis 52 of camera 22 and center axis 54 of camera 24 is shown in FIG. 2 as angle 62. Angles 60 and 62 should be identical and, again, in a range between 32 and 37 degrees.

For purposes of clarity, camera 20 shall be deemed the left camera, camera 22 shall be deemed the center camera, and camera 24 shall be deemed the right camera, as shown in FIG. 2.

Also mounted on platform 34 are movable reflective members, or mirrors, 70 and 72, as shown in FIG. 1. Each movable reflective member may be pivoted about an axis perpendicular to the surface of platform 34. The orientation and position of each movable reflective member is adapted to control the image which is incident upon the corresponding outer-most camera, as positioned on the platform. Thus, reflective member 70 is positioned to control the image which is incident upon camera 20 while reflective member 72 is positioned to control the image incident upon camera 24. An object positioned in front and to the left of the platform at position 80, as shown in FIGS. 1 and 2, falls within the view of left camera 20, as reflected by mirror 70. An object in front of the platform at position 82, falls within the image observed by camera 22, straight ahead of the platform. An object in front and to the right of the platform at position 84 falls within the image observed by camera 24 as reflected by mirror 72. Thus, a cinematic or panoramic wide-screen (objective) image, which includes a sweeping view of positions 80, 82, and 84 is captured in three image segments by cameras 20, 22, and 24.

Each of the cameras 20, 22, and 24 essentially serves to convert an image segment into an electrical signal. As such, each camera is a video signal generator which produces a video signal in response to an observed segment of the wide-screen image.

Each of the three cameras, 20, 22, and 24, preferably are conventional video cameras. Camcorders may also be used. Ideally, the focal length of each of the cameras is the same, and is in the range between 25 mm and 30 mm (for an image size that corresponds to standard 35 mm photography). The cameras may be any make or any quality provided that they are operable when positioned on their sides. Each camera has the FCC standard horizontal scan, and is secured to platform 30 (by its corresponding mounting base 28, 30, and 32) on it's side so that the scan lines of each video image segment run vertically, top to bottom, instead of from side-to-side as is customary in FCC television standard video. For purposes of this description, the platform 34 serves as a horizontal reference plane for the three cameras.

Each of the three cameras 20, 22, and 24 is mounted on it's side at (ideally) exactly 90° from vertical. This orientation aligns the width portion of the camera's image to a line that runs perpendicular to the plane of the platform. The central camera 22 is turned 90° to the right (when viewed from behind the lens 42). The left camera 20 is turned 90° to the left and is positioned so that lens 40 is angled toward the lens 42 of the center camera 22, facing the left mirror 70. The right camera 24 is turned 90° to the right (when viewed from behind the lens 44) and is positioned so that it's lens 44 is likewise angled toward the lens of center camera 22, facing right mirror 72. A test to confirm proper camera orientation is discussed below.

A representation of the projected scan for cameras 20, 22, and 24 is shown in FIG. 2 as projections 74, 76 and 78, respectively. Each scan starts at point 's' and proceeds across the camera's width. For camera 20, the scan proceeds upwardly. For cameras 22 and 24, the scan proceeds downwardly.

The movable reflective members 70 and 72 are optical quality front-silvered mirrors, with the reflective portion (or front) of each mirror facing outwardly, away from the axis 52 of center camera 22. These mirrors are adjustable and may be fixed in a number of orientations. The mirrors are pivotable on a vertical axis. Mirror 70 is hinged at 90 as shown in FIG. 1. Mirror 72 is hinged at 92. Thus, the hinge at 90 controls the orientation of mirror 70 and the hinge 92 controls the orientation of mirror 72.

Each camera, 20, 22, and 24, generates a video output signal on corresponding cables 100, 102, and 104.

All of the elements recited above comprise the camera portion 12 which serves to gather segments of the widescreen image for display.

In an alternative embodiment, the video output signals may be forwarded on cables 101, 103, and 105 to video cassette recorders 110, 112, and 114. Thus, for example, the video output signal from camera 20 is recorded on recorder 110. The video output signal from center camera 22 is recorded on recorder 112, and the video output signal from camera 24 is recorded on recorder 114.

Once image segments have been recorded on video cassette recorders 110, 112, and 114, a complete image may be displayed, by playback of the recorded segments, as a composite of the three image segments.

If yet another alternative embodiment is desired, dockable or camcorder video recording systems may be used, whereupon the signal is recorded at the camera.

Alternatively, the video signals may be used directly to produce image segments without a recording step. Monitor 120 is selectively responsive to either input cable 100, which is an input directly from camera 20, or input cable 111, from recorder 110. Similarly, monitor 122 is selectively responsive to either input cable 102, which is an input directly from camera 22, or input cable 113, from recorder 112 and monitor 124 is selectively responsive to either input cable 104, which is an input directly from camera 24, or input cable 115, from recorder 114.

If the image segments are recorded, then playback of the three image segment recordings may be synchronized by first being rerecorded onto laser discs and then played back over specially synchronized laser disc players. One system for accomplishing this synchronized playback is the LasrPlay (tm), a programmable controller for use with Pioneer (tm) brand LaserDisc players. The LasrPlay controls three laser disk players such that when one disk has found the starting frame number, it checks a network to see if the other two players are ready to play. If not, the LasrPlay continues to wait for the other two players. Once all of the players have reached their starting frames, they all start playing at the same time. If the LaserDisc players all have video sync looped through (only available on 4000 and 8000 series), the starting of the playback will be frame accurate, otherwise they will all start within (plus or minus) one frame.

Figure 4:
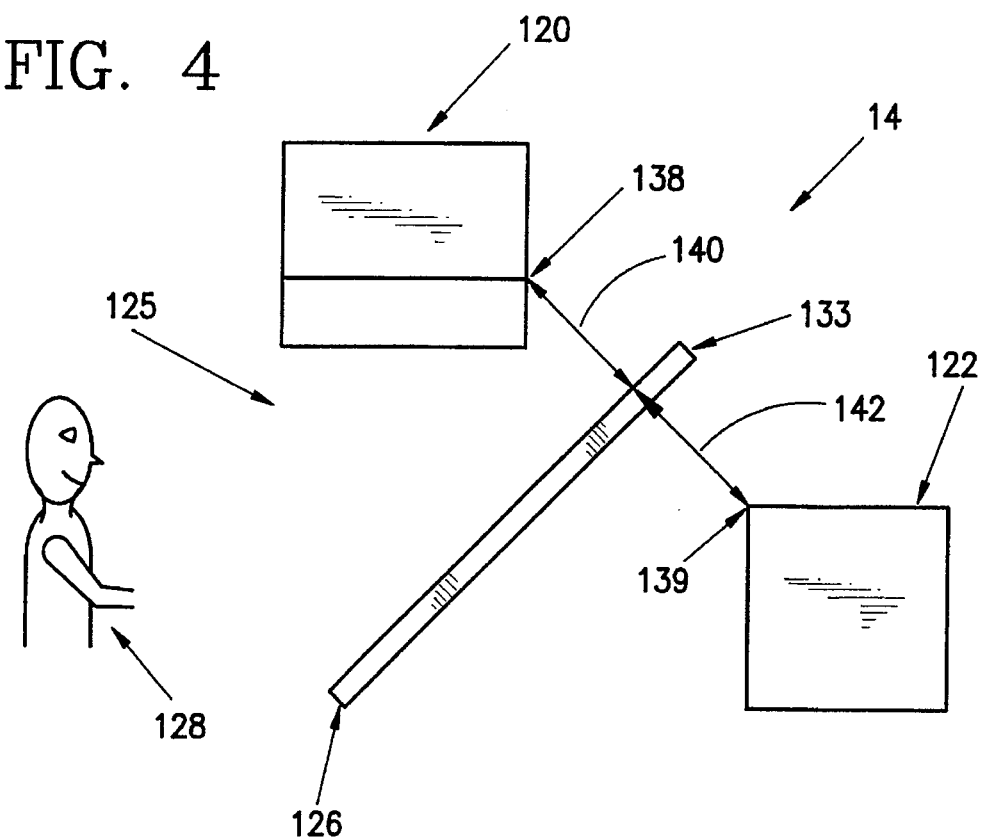
FIG. 4 illustrates, in side view, the display portion of the wide-screen video system of FIG. 1, including a half-silvered mirror viewing screen and two of the three video monitors, with the right monitor removed to show the orientation of the left monitor.

Turning back now to FIG. 1, an image segment recorded in left camera 20 is used as an input to video monitor 120. As shown in FIG. 1 and FIG. 4, the video signal from center camera 22 is an input to video monitor 122. The image signal from right camera 24 is an input to video monitor 124. The video monitors 120, 122, and 124 may be ordinary televisions sets and are preferably substantially identical units. Each monitor 120, 122, and 124 has a display screen on which it's corresponding image segment is displayed. Each segment forms a part of a composite image representing the wide-screen image recorded by the three cameras. In the preferred embodiment, the display screen of each monitor has the standard television aspect ratio of 4:3, as described above. Each monitor is housed in it's own cabinet, having a screen on a front side, the screen having a top, a bottom, a left side, and a right side. The monitor display screen is preferably a conventional cathode ray display tube having a raster scan which begins at the top left side and ends at the bottom right side, in accordance with FCC television standards.

Each scan moves from left to right and successive scans are interleaved, progressing from top to bottom. This nomenclature will be used in describing the orientation of the monitors. Please refer to FIGS. 1, 3, and 4.

The monitors 120, 122, and 124 are located at a viewing station 125, and are arranged in chosen orientations with respect to a half-silvered imaging mirror 126. The center monitor 122 is turned sideways 90° to its right, as viewed from a position of a viewer 128 (as shown in FIG. 4). The position of the viewer is in front of the center monitor 122 and the half-silvered mirror 126. From the perspective of the viewer at position 128, the center monitor 122 is positioned behind the center portion of half-silvered mirror 126. The mirror 126 reflects 50% of incident light and transmits 50% of incident light and is large enough to accommodate the image segments from three monitors. Thus, the half-silvered mirror 126 is equal in width to at least three times the height of monitor 122, thereby allowing room for three side-by-side image segments, each rotated 90°, as provided by monitors 120, 122, and 124, to produce a single apparently continuous composite image.

Figure 3:
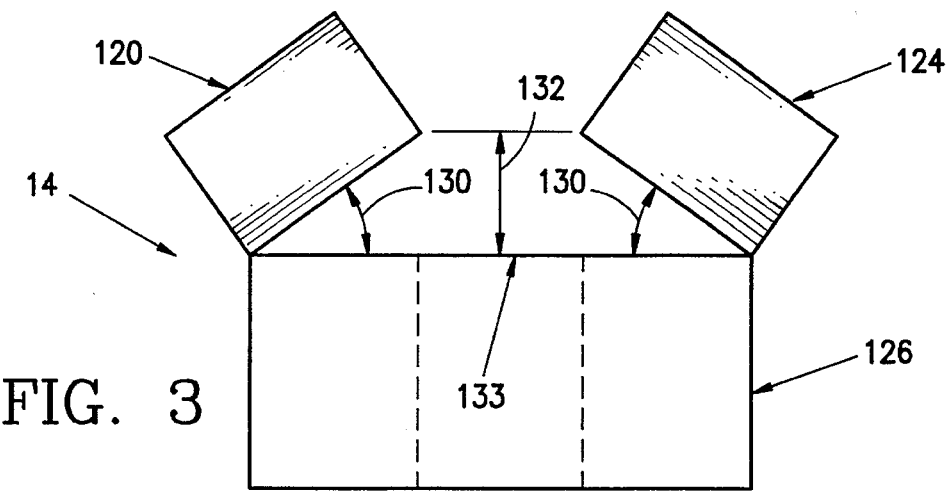
FIG. 3 illustrates, in a diagrammatic form, the front elevation of the display portion of the present invention.

The left monitor 120 is positioned above the mirror 126 with the display screen on the front of the monitor pointing downward towards the left side of mirror 126, as shown in FIGS. 1 and 3. Monitor 120 is also turned (or rotated) 90° so that the top of its screen faces the center of the half-silvered mirror 126. The left side of the half-silvered mirror 126 reflects the image segment displayed on the screen of monitor 120 toward the viewer. The rotation of the monitor 120 causes the reflected image to appear to have been rotated to the right by 90°, as seen from the position of the viewer 128. Similarly, the right side monitor 124 is positioned above the right side of mirror 126 with the front of the monitor pointing downwardly toward the top surface of the half-silvered mirror 126, and is positioned with the top of the monitor facing the center of the half-silvered mirror, such that the reflected image, as viewed from the viewing position 128, appears to be rotated to the left by 90°.

As illustrated in FIG. 4, the half-silvered mirror 126 is positioned at a 45° angle with respect to the front of center monitor 122. FIG. 1 illustrates that the left monitor 120 and the right monitor 124 are positioned above the half-silvered mirror 126. The monitors are tilted toward each other at an angle 130, as shown in FIG. 3. Angle 130 corresponds to the angle of coverage for each of the substantially identical lenses 40, 42 and 44.

The inner-most (right) back corner 138 of monitor 120 is shown positioned at a distance 140 from the surface of the half-silvered mirror 126. Similarly, the inner-most (left) back corner of monitor 124 is positioned at that same distance from the surface of the half-silvered mirror.

Distance 132, as shown in FIG. 3, is arbitrary, but should be equal to the length of the side of a monitor 135 plus the sine of angle 130.

Figure 5:
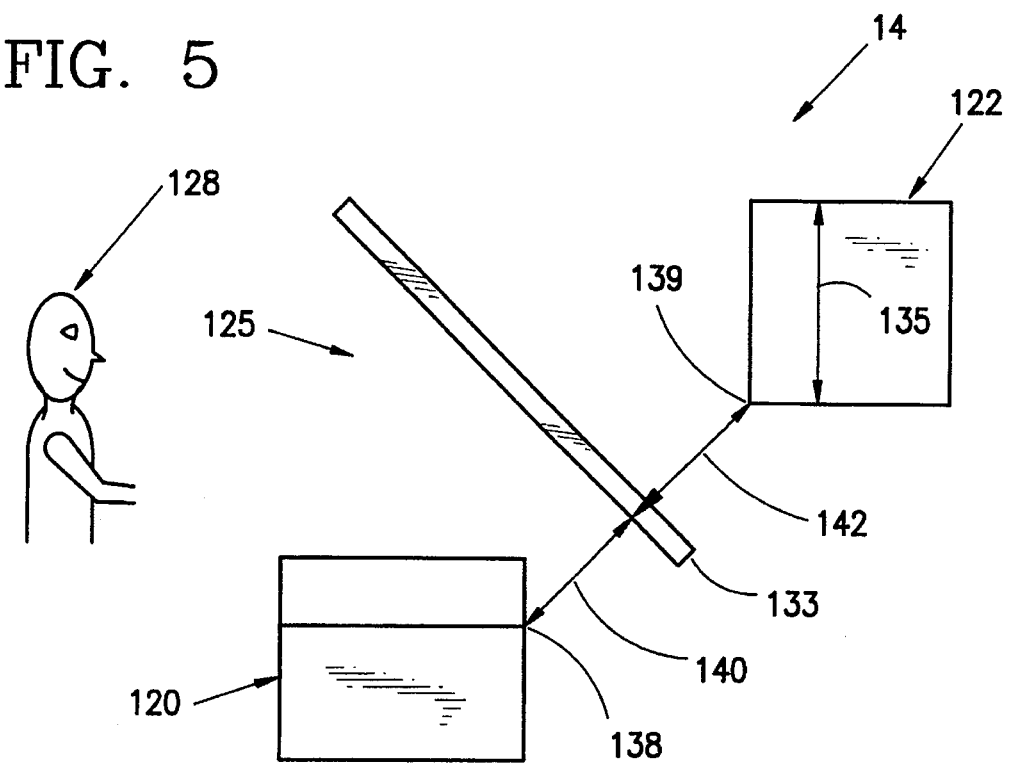
FIG. 5 illustrates, in side view, an alternative display portion of the wide-screen video system, including an alternative orientation for the half-silvered mirror viewing screen and two of the three video monitors, with the right monitor removed to show the orientation of the left monitor.

As illustrated in FIG. 4. Half-silvered mirror 126 is shown as having an arbitrary top edge 133, so that the top edge 133 extends beyond the top of center monitor 122 and behind right and left monitors 120 and 124. FIG. 5 is a right side elevation view of the display portion, but with right monitor 124 missing. This allows the orientation of the screens to be better illustrated. In this embodiment, the monitors are positioned so that the inside back corner of monitor 120, shown as 138, is a chosen distance 140 from the half-silvered mirror. The front, top left corner of center monitor 122 is positioned at that same distance 142 from the back of the reflective surface of the half silvered mirror. Here, lines 140 and 142 are equal in length, are collinear and are perpendicular to opposing parallel planar surfaces of half silvered mirror 126. Put another way, if an imaginary line was drawn from the inside (right) back bottom corner 138 of monitor 120 to the left front top corner 139 of monitor 122, that imaginary line would be bisected by the mirror 126 and would be perpendicular to the mirror's planar surfaces.

The center monitor is positioned such that it's entire front top edge is at the distance 142 from the mirror 126. Hence, the orientation of the right monitor 124 is similarly aligned. Thus, if a second imaginary line was drawn from the inside (left) back bottom corner of monitor 124 to the right front top corner of center monitor 122, that second imaginary line would also be bisected by the mirror 126 and would be perpendicular to the mirror's planar surfaces.

In order to align the left, center, and right displayed image segments produced by monitors 120, 122, and 124, to produce a composite image on mirror 126, the left monitor 120 and the right monitor 124 must be tilted up (from a horizontal plane including the top edge of the half-silvered mirror 126) at the angle 130 to be equal to the angular displacement between the axes 50, 52, and 54 of cameras 20, 22, and 24, which again, should be between 32 and 37 degrees. The angle 130 is ideally equivalent to the field of coverage of the camera lens used as part of the camera portion 12.

Finally, the entire display portion is covered with a substantially light-tight box or drape which covers the top, back and two sides of the display portion to eliminate distracting reflections on the half-silvered mirror 126 from ambient light sources. Only the portion of the half silvered mirror which is visible from the viewing position 128 need be uncovered. This enhances the contrast of the composite image and reduces glare from room lights.

When the positions of the cameras and monitors are proper and the three image segments reflected by mirror 126 are carefully aligned, the viewer looking into the half-silvered mirror from the viewers position 128 will see an apparently continuous wide-screen composite image comprised of three image segments. Each image segment includes 525 scan lines (for FCC standard television images). Thus, an apparently continuous wide-screen composite image comprised of approximately 1500 television scan lines is produced. The composite image will reproduce a view of up to 150 degrees in width and have a width-to-height aspect ratio of approximately 2.25 to 1. Essentially then, a wide-screen composite image is produced on mirror 126 which will include positions 80, 82, and 84.

With cameras 20, 22, and 24 arranged on horizontal platform 34 in the manner described above, a test may be performed. For this test, the video output signals on cables 100, 102, and 104 are input to televisions or video monitors which are situated on a horizontal surface in the usual manner as shown in FIG. 2. These monitors, 140, 142, and 144, each have a horizontal axis (the screen's width) and a vertical axis (the screen's height). The signals from cameras 20, 22, and 24 should appear on test monitors 140, 142, and 144 as follows: the center camera, 22 shows it's subject turned 90° toward the left. Thus, as shown in FIG. 2, a subject C at position 82 is shown as a figure C turned 90° towards the left on monitor 142. The left camera 20 shows it's subject turned 90° towards the right and mirror reversed along monitor 140's screens vertical axis. The right camera 24 shows it's subject, the R at position 84, turned 90° towards the left and mirror reversed along the monitor 144's screens vertical axis.

Once the cameras have been secured and the mirrors 70 and 72 have been adjusted, the process of capturing wide-screen images as image segments can begin. Here, image capture is intended as a generalized description of image recording or image transmission. The cameras, mounted on platform 34 may be manipulated as a unit and can be maneuvered as one might an ordinary camera.

Before video recording can occur, it is necessary to establish the degree of overscan present in the monitors or television sets chosen for the display—which for obvious reasons should be as flat and squared-off as available (in the present embodiment, three Panasonic (tm) SF 27" televisions are used). "Overscan" refers to that portion of the total scanned video image not visible to the viewer. This is usually about 10%, which means that of 525 scan lines mandated by the FCC standards, only about 470 are in fact viewable. This precise figure, which can be measured using a commonly available alignment chart, is needed to properly align the camera images so that the joints or boundaries between the displayed image segments will match properly.

The alignment of the camera images is greatly facilitated by the ability to pivot mirrors 70 and 72. In addition to providing flexibility in shooting for differently overscanned monitors, this ability to pivot permits convergence adaptations required by extreme changes in subject distances from the cameras. Mirror pivot position may also be used to compensate for camera lenses in which the size of the field of view varies with the focus setting. In each case, pivoting the mirrors 70 and 72 allows the operator to precisely align the edges joining the three images.

Once the cameras 20, 22 and 24, mirrors 70 and 72, and monitors 120, 122 and 124 are properly aligned, the half-silvered mirror 126 appears to be illuminated by a single wide-screen image. The image segments from left monitor 120 and right monitor 124 are reflected from the upwardly facing surface of the half-silvered mirror 126 toward the viewer's position 128, while the image segment from the center monitor 122 is transmitted through the half-silvered mirror directly to the viewer's position 128. If the captured wide-screen image was one including fields of view with positions 80, 82, and 84, as shown in front of camera portion 12, then the image signal produced by left monitor 120 will include the field of view with position 80, the image segment produced by center monitor 122 will include the field of view with position 82, and the image segment produced by right monitor 124 would include the field of view with position 84.

In use, a scene of cinematic or panoramic proportions is reduced to three electronic signals using cameras 20, 22, and 24. Camera 20 captures a left image segment which is mirror-reversed by mirror 70. The effect of this reversal is undone, upon display, by reflecting that segment from the top surface of half-silvered mirror 126. The center portion of the image is captured by camera 22 and that center portion, or image segment, is transmitted directly through half-silvered mirror 126 without mirror-reversal. The right portion of the image is captured by camera 24 after it has been mirror-reversed through mirror 72. That mirror-reversal is undone, upon display, by reflecting that segment from the top surface of half-silvered mirror 126. Thus, the left and right image segments are mirror reversed as part of the operation of the camera portion 12 but the mirror reversal of the left and right image segments is undone by reflecting the images of left monitor 120 and right monitor 124 off of half-silvered mirror 126.

FCC standards accommodate two audio program signals in addition to the video signal. Thus, a simple six-channel audio system, compatible with 70 mm film systems, can be implemented. The applicant has implemented an (as yet unreleased) video production utilizing this format, the sound was positioned as follows:

left video master carries two channels of "ambient" or "live" stereo sound, appropriately mixed;

right video master carries two channels of stereo music, likewise appropriately mixed;

center video master carries one channel of "center" audio information (mostly narration) and one channel of "surround" effects.

Each audio track is fed directly from the laser disc (Pioneer 2400) player to a separate adjustable Fostek (tm) speaker, thus obviating the need for amplifiers, matrix decoders, and the like, and permitting complete flexibility in designing acoustics for the audio portion of the presentation.

This embodiment, as shown in FIG. 3 and FIG. 4 is the preferred embodiment. However, another embodiment may be implemented by reversing some of the elements, as shown in FIG. 5. There, mirror 126 is tilted with the bottom surface facing the viewing position 128 and the left and right monitors 120, 124 placed below and facing upwardly. Otherwise, the orientation, as described above, is the same. At present, this is not the preferred embodiment; the applicant has discovered problems with screen phosphates falling into the color guns in the left and right upwardly facing monitors.

Other variations are possible. The invention has been described with references to use of video cameras, video recorders, and televisions or video monitors. In practice, however, any transducer for converting an image into an electronic signal, either analog or digital, could be used to generate the image signals which are output on cables 100, 102, and 104. Similarly, any monitor which is used to convert electronic image signals, analog or digital, into a visually perceptible image, could be used to illuminate the half-silvered mirror 126. Accordingly, the raster-scan lines merely represent a way to describe a linear section of an image. For the purposes of this invention, a linear array of pixels could be the functional equivalent of a raster-scan line, however that array of pixels is produced. For example, arrays of pixels may be generated by liquid crystal displays, gas plasma displays or other means.

The foregoing describes the preferred embodiments of the present invention along with a number of possible alternatives. A person of ordinary skill in the art will recognize that modifications of the described embodiments may be made without departing from the true spirit and scope of the invention. The invention is therefore not restricted to the embodiments disclosed above, but is defined in the following claims.

I claim:

1. A composite video signal generation and display system for capturing and displaying a wide-angle image, comprising:

a first video camera, for generating a first video image signal which represents a first segment of the image, said first video camera positioned such that scan lines of the first video image signal run vertically, with respect to a horizontal platform reference plane;

a second video camera, for generating a second video image signal which represents a second segment of the image which is juxtaposed to said first segment of the image, said second video camera positioned such that scan lines of the second video image signal run vertically, with respect to the horizontal platform reference plane;

a third video camera, for generating a third video image signal which represents a third segment of the image which is juxtaposed to said second segment of the image, said third video camera positioned such that scan lines of the third video image signal run vertically, with respect to the horizontal platform reference plane, said first, second and third video cameras being arrayed with a selected angular displacement between said first and second image segments and said second and third image segments;

a first adjustable mirror for aligning said first and second image segments;

a second adjustable mirror for aligning said second and third image segments;

a first video signal display, responsive to said first video image signal, and rotated 90 degrees from a first horizontal reference plane, such that video scan lines displayed run vertically, to produce a first display image segment;

a second video signal display, responsive to said second video image signal, and rotated 90 degrees from a second horizontal reference plane, such that video scan lines displayed run vertically, to produce a second display image segment;

a third video signal display, responsive to said third video image signal, and rotated 90 degrees from said first horizontal reference plane, such that video scan lines displayed run vertically, to produce a third display image segment; and a composite image display surface, which includes:

a structure for supporting said first video signal display, said second video signal display and said third video signal display, said structure supporting said first and third video signal displays at an angle which corresponds to said selected angular displacements between said first and second image segments and said second and third image segments, as generated by said video cameras;

a half-silvered mirror which reflects said first and third image segments from said first and third video signal displays toward a viewing position, wherein said half-silvered mirror transmits said second image segment toward the viewing position, and whereby said first, second and third image segments are juxtaposed into a representation of the wide-angle image upon said half silvered mirror, as viewed from the viewing position.

2. The composite video signal generation and display system of claim 1 further comprising first, second and third image recorders for recording said first, second and third video image signals, thereby producing first, second and third video image recordings.

3. The composite video signal generation and display system of claim 2 further comprising first, second and third image recording playback decks for playback of said first, second and third video image recordings.

4. The composite video signal generation and display system of claim 1 wherein said first, second and third video image signals are electrical analog signals.

5. The composite video signal generation and display system of claim 1 wherein said first, second and third video image signals are digital signals.

6. The composite video signal generation and display system of claim 1 wherein said first, second and third video signal displays are raster-scanned televisions.

7. The composite video signal generation and display system of claim 1 wherein said first, second and third video signal displays are liquid crystal display monitors.

8. The composite video signal generation and display system of claim 1 wherein said first, second and third video signal displays are gas plasma display monitors.

9. A method for capturing and displaying a wide-angle image, comprising:

generating a first video-camera image signal which represents a first segment of the image, having scan lines which run vertically with respect to a horizontal platform reference plane;

generating a second video-camera image signal which represents a second segment of the image, which is juxtaposed to said first segment of the image and angularly displaced therefrom by a selected angle, having scan lines which run vertically with respect to the horizontal platform reference plane;

generating a third video-camera image signal which represents a third segment of the image, which is juxtaposed to said second segment of the image and angularly displaced therefrom by said selected angle, having scan lines which run vertically with respect to the horizontal platform reference plane;

displaying, in response to said first video-camera image signal, a first display image segment, rotated 90 degrees from a first horizontal reference plane and angularly displaced therefrom by said selected angle, such that video scan lines displayed run vertically;

displaying, in response to said second video-camera image signal, a second display image segment, rotated 90 degrees from a second horizontal reference plane, such that video scan lines displayed run vertically;

displaying, in response to said third video-camera image signal, a third display image segment, rotated 90 degrees from said first horizontal reference plane and angularly displaced therefrom by said selected angle, such that video scan lines displayed run vertically;

projecting said first and third display image segments onto a half-silvered mirror which reflects said first and third image segments from said first and third video signal displays toward a viewing position; and projecting said second display image segment into said half-silvered mirror, which transmits said second image segment toward said viewing position, whereby said first, second and third display image segments are juxtaposed into a representation of the wide-angle image upon said half-silvered mirror, as viewed from said viewing position.

10. A method for capturing and displaying a wide-angle image, comprising:

generating a first video image signal which represents a first segment of the image, having scan lines which run vertically with respect to a horizontal platform reference plane and mirror-reversed across said scan lines;

generating a second video image signal which represents a second segment of the image, juxtaposed to said first segment of the image and angularly displaced therefrom by a selected angle, and having scan lines which run vertically with respect to the horizontal platform reference plane;

generating a third video image signal which represents a third segment of the image, juxtaposed to said second segment of the image and angularly displaced therefrom by said selected angle, and having scan lines which run vertically with respect to the horizontal platform reference plane and mirror-reversed across said scan lines;

displaying, in response to said first video image signal, a first display image segment, rotated 90 degrees from a first horizontal reference plane and angularly displaced therefrom by said selected angle, such that video scan lines displayed run vertically;

displaying, in response to said second video image signal, a second display image segment, rotated 90 degrees from a second horizontal reference plane, such that video scan lines displayed run vertically;

displaying, in response to said third video image signal, a third display image segment, rotated 90 degrees from said first horizontal reference plane and angularly displaced therefrom by said selected angle, such that video scan lines displayed run vertically;

projecting said first and third display image segments onto a half-silvered mirror which reflects and mirror-reverses said first and third image segments from said first and third video signal displays, thereby propagating them toward a viewing position; and, projecting said second display image segment into said half-silvered mirror, which transmits said second image segment toward said viewing position, whereby said first, second and third display image segments are juxtaposed into a composite representation of the wide-angle image upon said half-silvered mirror, as viewed from said viewing position.

11. The method of claim 10 further including aligning said video image segments by adjusting first and second movable reflective members.

12. The method of claim 10 further including aligning said video display image segments by adjusting the position of said first and third video signal displays.

* * * * *